(12) United States Patent
Warburton et al.

(10) Patent No.: US 9,676,258 B2
(45) Date of Patent: Jun. 13, 2017

(54) SYSTEM FOR CONTROLLING THE DOORS OF A POWERED SPLIT TAILGATE

(71) Applicant: JAGUAR LAND ROVER LIMITED, Warwickshire (GB)

(72) Inventors: Andrew Warburton, Coventry (GB); Duncan Loveday, Coventry (GB); Steven Thomas, Coventry (GB)

(73) Assignee: JAGUAR LAND ROVER LIMITED, Whitley, Coventry (GB)

( * ) Notice: Subject to any disclaimer, the term of this patent is extended or adjusted under 35 U.S.C. 154(b) by 0 days.

(21) Appl. No.: 15/055,935

(22) Filed: Feb. 29, 2016

(65) Prior Publication Data
US 2016/0193903 A1 Jul. 7, 2016

Related U.S. Application Data

(63) Continuation of application No. 14/426,198, filed as application No. PCT/EP2013/068467 on Sep. 6, 2013, now Pat. No. 9,308,802.

(30) Foreign Application Priority Data

Sep. 6, 2012 (GB) .................................. 1215965.3

(51) Int. Cl.
*B60J 5/10* (2006.01)
*E05F 5/12* (2006.01)
*E05F 15/00* (2015.01)

(52) U.S. Cl.
CPC .............. *B60J 5/102* (2013.01); *B60J 5/103* (2013.01); *E05F 5/12* (2013.01); *E05F 15/00* (2013.01);
(Continued)

(58) Field of Classification Search
CPC .... B60J 5/102; B60J 5/103; E05F 5/12; E05F 15/00; E05Y 2400/415; E05Y 2400/54;
(Continued)

(56) References Cited

U.S. PATENT DOCUMENTS

2005/0085972 A1 4/2005 Martinez
2007/0063527 A1 3/2007 Ueda et al.
(Continued)

FOREIGN PATENT DOCUMENTS

GB 2452752 A 3/2009
JP 2007009456 1/2007
(Continued)

OTHER PUBLICATIONS

International Search Report for International application No. PCT/EP2013/068467 mailed Dec. 5, 2013.
(Continued)

*Primary Examiner* — McDieunel Marc
*Assistant Examiner* — James E Stroud
(74) *Attorney, Agent, or Firm* — Carlson, Gaskey & Olds

(57) ABSTRACT

A power, split door system for a vehicle includes a first vehicle door and a second vehicle door arranged to be articulated between closed and open positions. A controller controls movement of the first and second doors between the open and closed positions. A collision zone is defined as a region of the door system in which the first vehicle door and the second vehicle door could potentially come into contact with one another. If both of the doors are within the collision zone during powered articulation of the doors, both are stopped within the collision zone and articulated in a reverse direction to the direction they were being articulated in and into either their fully open or fully closed positions in an appropriate manner that avoids collision of the doors or the doors may remain stopped.

20 Claims, 7 Drawing Sheets

(52) U.S. Cl.
CPC ..... *E05Y 2400/415* (2013.01); *E05Y 2400/54* (2013.01); *E05Y 2900/00* (2013.01); *E05Y 2900/50* (2013.01); *E05Y 2900/532* (2013.01); *E05Y 2900/544* (2013.01); *E05Y 2900/546* (2013.01)

(58) Field of Classification Search
CPC ............. E05Y 2900/00; E05Y 2900/50; E05Y 2900/532; E05Y 2900/544; E05Y 2900/546
USPC .......................................................... 701/49
See application file for complete search history.

(56) References Cited

U.S. PATENT DOCUMENTS

| | | |
|---|---|---|
| 2010/0319261 A1 | 12/2010 | Beck et al. |
| 2011/0031055 A1* | 2/2011 | Rajasingham ....... B60N 2/4235 180/271 |
| 2014/0025262 A1 | 1/2014 | Eggeling et al. |
| 2014/0207344 A1 | 7/2014 | Ihlenburg et al. |
| 2015/0224859 A1* | 8/2015 | Warburton ............... B60J 5/103 701/49 |
| 2015/0275562 A1* | 10/2015 | Warburton ............... B60J 5/103 701/49 |

FOREIGN PATENT DOCUMENTS

| | | |
|---|---|---|
| WO | 2010119080 A2 | 10/2010 |
| WO | 2012019718 A1 | 2/2012 |

OTHER PUBLICATIONS

Combined Search and Examination Report under Sections 17 and 18(3) for Application No. GB1222259.2 dated Apr. 15, 2013.

\* cited by examiner

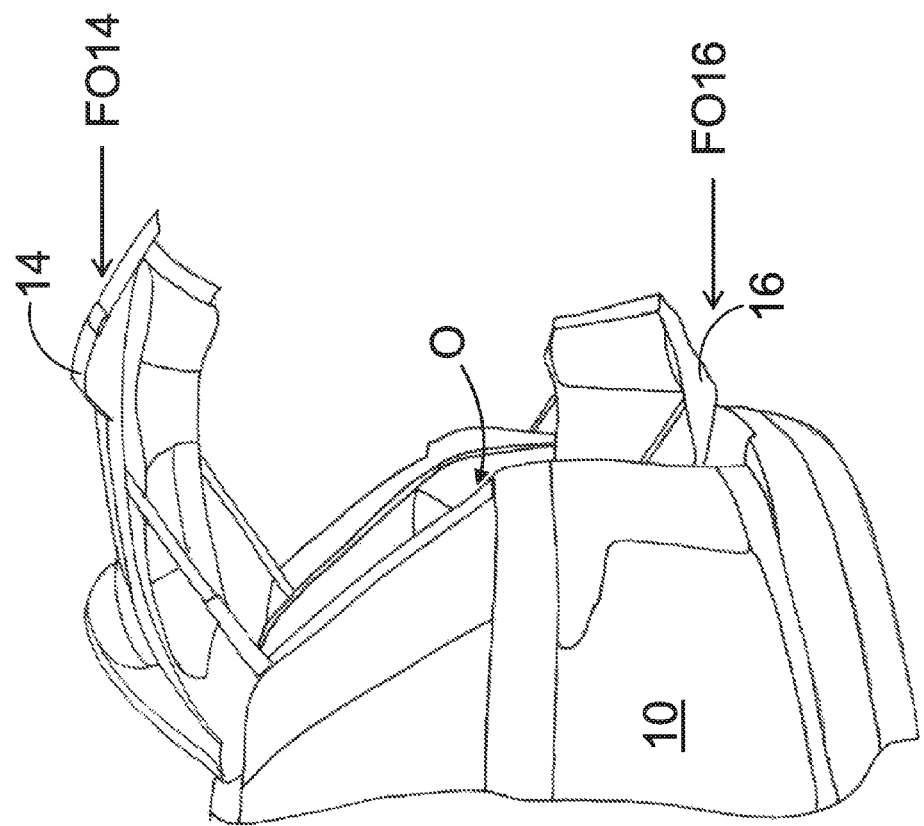
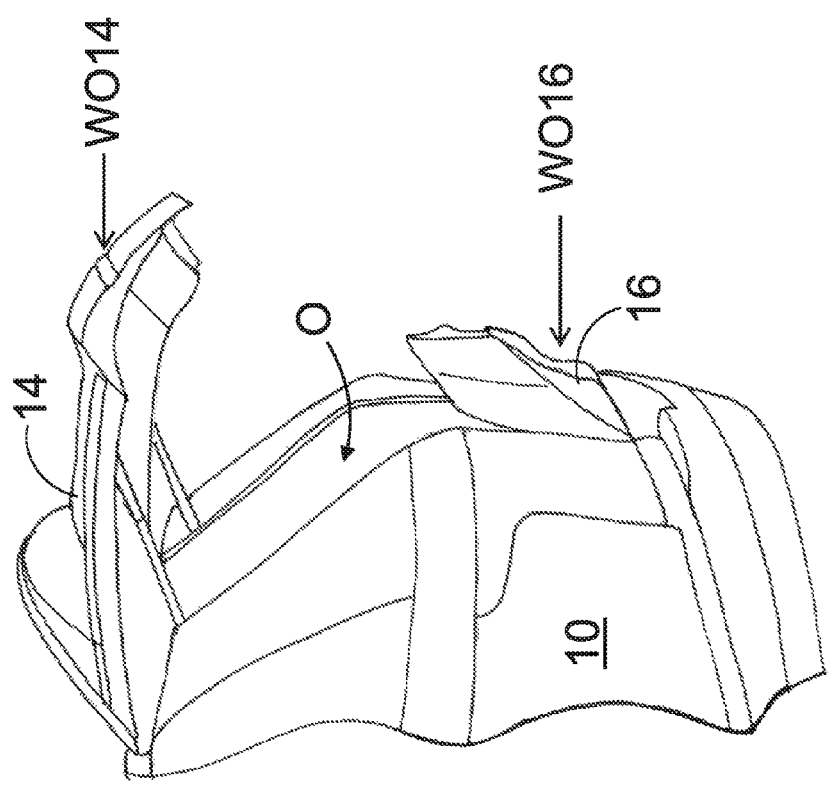
Fig. 5d
Fig. 5c

SYSTEM FOR CONTROLLING THE DOORS OF A POWERED SPLIT TAILGATE

CROSS REFERENCE TO RELATED APPLICATION

This application is a continuation of U.S. patent application Ser. No. 14/426,198 filed Mar. 5, 2015, which is a national phase application of International Application No. PCT/EP2013/068467 filed Sep. 6, 2013, which claims priority to Application No. GB 1215965.3 filed Sep. 6, 2012.

TECHNICAL FIELD

The present invention relates to a system for controlling the doors of a powered split tailgate for a vehicle, wherein each door is independently powered and controlled. Particularly, but not exclusively, the invention relates to a tailgate system wherein a collision zone is defined and in the event that the first and second vehicle doors are both stopped within the collision zone during a powered articulation, the control means is configured to control the first and second vehicle doors in an appropriate manner that avoids collision of the first and second vehicle doors. Aspects of the invention relate to a vehicle, a control system, a power split door system, a method and a program.

BACKGROUND

The present invention is related to published PCT patent application no. PCT/EP2010/054914 (International publication no. WO2010/119080), to the present applicant, which is expressly incorporated herein, in its entirety, by reference.

In PCT no. PCT/EP2010/054914 (International publication no. WO2010/119080) a vehicle is disclosed which comprises a tailgate at a rear of the vehicle. The tailgate includes two doors that open to provide access to a passenger compartment within the vehicle. The disclosed tailgate system is a power, split door system that comprises a first vehicle door arranged to articulate between a closed position and an open position and a second vehicle door arranged to articulate between a closed position and an open position. It is also disclosed to use first and second drive means for moving the first and second doors, respectively, between the closed and open positions; and a control means for controlling the first and second drive means so as to control movement of the first and second doors between the open and closed positions.

The present invention seeks to provide further improvements in the field of power split tailgate door systems which finds particular advantageous application in vehicles. The invention may be utilised in applications other than for vehicles.

SUMMARY

Aspects of the invention provide a control system, a powered split door system for a vehicle, a program and a method as claimed in the appended claims.

According to another aspect of the invention for which protection is sought, there is provided a powered split door system for a vehicle, comprising: a first vehicle door arranged to articulate between a closed position and an open position; a second vehicle door arranged to articulate between a closed position and an open position; first and second drive means for articulating the first and second vehicle doors, respectively, between the closed and open positions; and a control means for controlling the first and second drive means so as to control movement of the first and second doors between the open and closed positions; wherein a collision zone is defined as a region of the door system in which the first vehicle door and the second vehicle door could potentially come into contact with one another; wherein the control means is configured to determine if both of the first and second vehicle doors are within a collision zone during powered articulation of the vehicle doors; and where, in the event that the first and second vehicle doors are both stopped within the collision zone during a powered articulation, the control means is configured to control the first and second drive means to articulate the first and second vehicle doors in a reverse direction to the direction they were being articulated in and into either their fully open or fully closed positions in an appropriate manner that avoids collision of the first and second vehicle doors or the control means is configured to maintain the first and second vehicle doors in a stopped condition.

Optionally, the first vehicle door partially overlaps the second vehicle door, when the first and second vehicle doors are in their closed positions and wherein the collision zone is defined based upon the geometry of the first and second doors and includes an additional margin.

Optionally, wherein the first vehicle door is an upper tailgate door and is disposed above the second vehicle door which is a lower tailgate door and wherein said additional margin of the collision zone extends from the lowest position in which the upper and lower doors could contact one another to immediately above the closed position of the lower tailgate door.

Additionally, the positions of the first upper and second lower vehicle doors can be categorised as being in any one of: a closed position; the collision zone; a wide open position; and a fully opened position and wherein the closed and fully open positions are single positions and wherein the collision zone and wide open position categories are ranges of positions and wherein no other position of either vehicle door is possible.

Additionally or alternatively, the system comprises means for detecting the presence of an obstacle extending out of a vehicle tailgate opening created when the first and second vehicle doors are at least partially open and/or for detecting an obstacle external to the vehicle in the opening path of either the first and/or second vehicle doors. Preferably, upon detection of an obstacle during powered articulation of one or both vehicle doors, the control means is configured to power stop the or each vehicle door that has detected an obstacle and reverse the direction of travel of the stopped vehicle door.

Optionally, where, in the event that the control means is controlling the first and second drive means to power-articulate the first and second doors into their closed positions and an obstacle extending out of the vehicle opening is detected and both the first and second vehicle doors are stopped within the collision zone, the control means is configured to articulate each of the first and second vehicle doors into its fully opened position.

Optionally, the control means is provided with positional information relating to each of the first and second vehicle doors; and wherein the control means is configured to ensure that each of the first and second vehicle doors do not attempt to occupy the same space at the same time during any powered articulation.

Optionally, the control means comprises a first control unit for controlling the first drive means and a second control unit for controlling the second drive means.

Optionally, the first control unit is supplied with positional data from one or more sensors and/or the first drive means and/or from another control system within the vehicle such that the first control unit is provided with positional information relating to the first vehicle door; the second control unit is supplied with positional data from one or more sensors and/or the second drive means and/or from another control system within the vehicle such that the second control unit is provided with positional information relating to the second vehicle door; and the first and second control units are in communication with one another to exchange positional data relating to the first and second vehicle doors therebetween such that each of the first and second control units is provided with positional data relating to both the first and the second vehicle doors.

Optionally, the first and second control units each receive positional data from sensors located on or within the first and second drive means respectively and wherein each of said sensors are Hall sensors.

Additionally, the first and second control units may each receive positional data from a body control management unit within the vehicle, and wherein said positional data from the body control management unit may be a determination that the first and/or second door is latched and is therefore located in its closed position.

Optionally, the first and second control units are each in communication with a controller area network (CAN) of the vehicle and thereby the first and second control units exchange positional data.

Optionally, the positional data exchanged by the first and second control units is categorised positional data.

According to another aspect of the invention, there is provided a method of controlling a first vehicle door arranged to articulate between a closed position and an open position; and a second vehicle door arranged to articulate between a closed position and an open position, the method comprising:
(i) obtaining positional data relating to the first vehicle door;
(ii) obtaining positional data relating to the second vehicle door;
(iii) defining a collision zone;
(iv) monitoring the positional data relating to the first and second vehicle doors and in the event that both the first and second vehicle doors are stopped in the collision zone during a powered articulation;
(vi) controlling the first and second drive means to articulate the first and second vehicle doors in a reverse direction to the direction they were being articulated in and into either their fully open or fully closed positions in an appropriate manner that avoids collision of the first and second vehicle doors or
(vii) maintaining the first and second vehicle doors in a stopped condition.

Optionally, the method may comprise controlling the first and second vehicle doors to move from an open position to a closed position and in the event that both the first and second vehicle doors are stopped in the collision zone, controlling the first and second drive means to articulate the first and second vehicle doors in a reverse direction into their fully open positions.

Further optionally, the first vehicle door partially overlaps the second vehicle door when the first and second vehicle doors are in their closed positions and wherein defining the collision zone includes considering the geometry of the first and second doors and includes adding a margin.

Additionally, the first vehicle door is an upper tailgate door and is disposed above the second vehicle door which is a lower tailgate door and wherein said margin of the collision zone extends from the lowest position in which the upper and lower doors could contact one another to immediately above the closed position of the lower tailgate door.

Optionally, obtaining positional information relating to the first upper and second lower vehicle doors comprises categorising the position of each door as being in any one of: a closed position; the collision zone; a wide open position; and a fully opened position and wherein the closed and fully open positions are single positions, wherein the collision zone and wide open position categories are ranges of positions and wherein no other position of either vehicle door is possible.

According to a further aspect of the present invention, there is provided a power, split door system for a vehicle, comprising: a first vehicle door arranged to articulate between a closed position and an open position; a second vehicle door arranged to articulate between a closed position and an open position; first and second drive means for articulating the first and second vehicle doors, respectively, between the closed and open positions; a control means for controlling the first and second drive means so as to control movement of the first and second doors between the open and closed positions; and at least one sensor arranged to detect during closing of one or both doors whether there is an obstacle which could prevent closure of one or both doors, and if such an obstacle is detected, the control system being configured to control at least one of the first and second drive means to stop movement of one or each door and then move the or each door in the reverse direction.

Optionally the control system is arranged to control the first and second drive means to move the or each door to substantially the fully open position. Optionally the or each sensor is provided on one of the vehicle doors.

According to a still further aspect of the present invention, there is provided a method of controlling a first vehicle door arranged to articulate between a closed position and an open position; and a second vehicle door arranged to articulate between a closed position and an open position, the method comprising:
(i) during closure of one or both the first and second vehicle doors, detecting whether there is an obstacle which could prevent closure of one or both doors;
(ii) if such an obstacle is detected, controlling at least one of the first and second drive means to articulate the one or each of the first and second vehicle doors in the reverse direction.

Optionally the method comprises controlling at least one of the first and second drive means to move the or each door to substantially the fully open position.

Within the scope of this application it is expressly envisaged that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF THE DRAWINGS

One or more embodiments of the invention will now be described, by way of example only, with reference to the accompanying drawings, in which:

FIGS. 5a-5d illustrate articulation of an upper tailgate door and a lower tailgate door from a closed position, into a collision zone, into a wide open position and into a fully open position.

Figure 1:
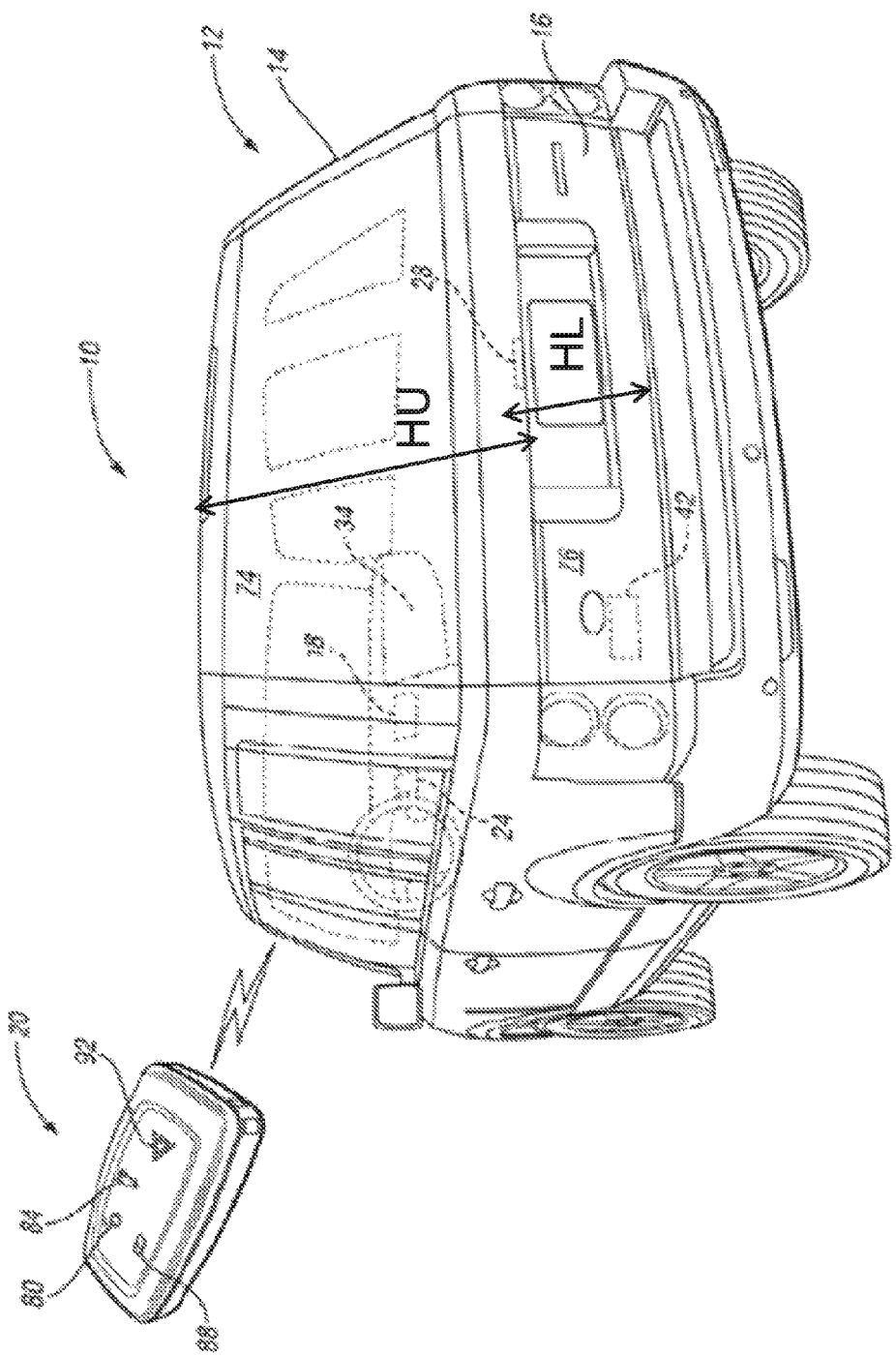
FIG. 1 illustrates a vehicle having a power split tailgate system according to an embodiment of the present invention.

To aid the understanding of the drawings in FIGS. 1 to 6, the following table is provided:

| Reference Numeral | Brief Description of Feature |
| --- | --- |
| 10 | vehicle |
| 12 | Split tailgate system |
| 14 | first vehicle door |
| 16 | second vehicle door |
| 18 | controller |
| 20 | Remote control fob |
| 24 | Fixed upper tailgate open/close dashboard button |
| 28 | Vehicle button included on the outside portion of the upper tailgate to control opening and closing of the upper tailgate door |
| 30 | Vehicle button included on the interior of the upper tailgate door to control opening of the upper tailgate door and closing of both of the upper and lower tail gate doors |
| 32 | Vehicle button included on the upper ledge of the lower tailgate to control open and closing of the lower tailgate door |
| 34 | dashboard |
| 40a, 40b | Upper drive mechanism |
| 42 | Lower drive mechanism |
| 50 | Cover |
| 52 | Storage area |
| 54 | Rear seat |
| 56 | bottom of the upper tailgate door |
| 58 | top of the rear seat |
| 66 | latch |
| 68 | Striker |
| 70 | Lip |
| 72 | Upper ledge of lower tailgate |
| 74 | exterior portion of the upper door |
| 76 | exterior portion of the lower door |
| 80 | fob button to unlock vehicle) |
| 83 | Body Control Management Unit (BCM) |
| 85 | First Control Unit for upper drive mechanism |
| 87 | Second Control Unit for lower drive mechanism |
| 89 | Controller Area Network (CAN) |
| 90a, 90b, 90c, 90d | Sensors on upper drive mechanism |
| 90e, 90f | Sensors on lower drive mechanism |

DETAILED DESCRIPTION

FIG. 1 illustrates a vehicle 10 having a split tailgate system 12 according to an optional embodiment of the present invention in a closed position. The split tailgate system 12 may be an electrically driven system configured to articulate a first vehicle door 14, (which in this illustrated arrangement is an upper tailgate door 14) and a second vehicle door 16, (which in this illustrated arrangement is a lower tailgate door 16) between fully open and closed positions. It will be recognised that in other embodiments, the first and second doors 14, 16 may be differently oriented and may not be "upper" and "lower" doors as such, for example, in other embodiments, the first and second doors 14, 16 may be in a side-by-side position.

FIGS. 2-5d illustrate the power or automatic movement of one or both of the upper and lower tailgate doors 14, 16 between closed and open positions. As shown, in the closed position, the upper tailgate door 14 overlaps the lower tailgate door 16 such that the upper tailgate door 14 must be at least partially opened before the lower tailgate door 16 can be opened (see FIG. 4). The lower tailgate door 16 has a height 'HL' that is substantially smaller than the height 'HU' of the upper tailgate door 14. The height 'HL' of the lower door 16 may be between about 5% and about 30% of the height 'HU' of the upper tailgate door 14.

Figure 2:
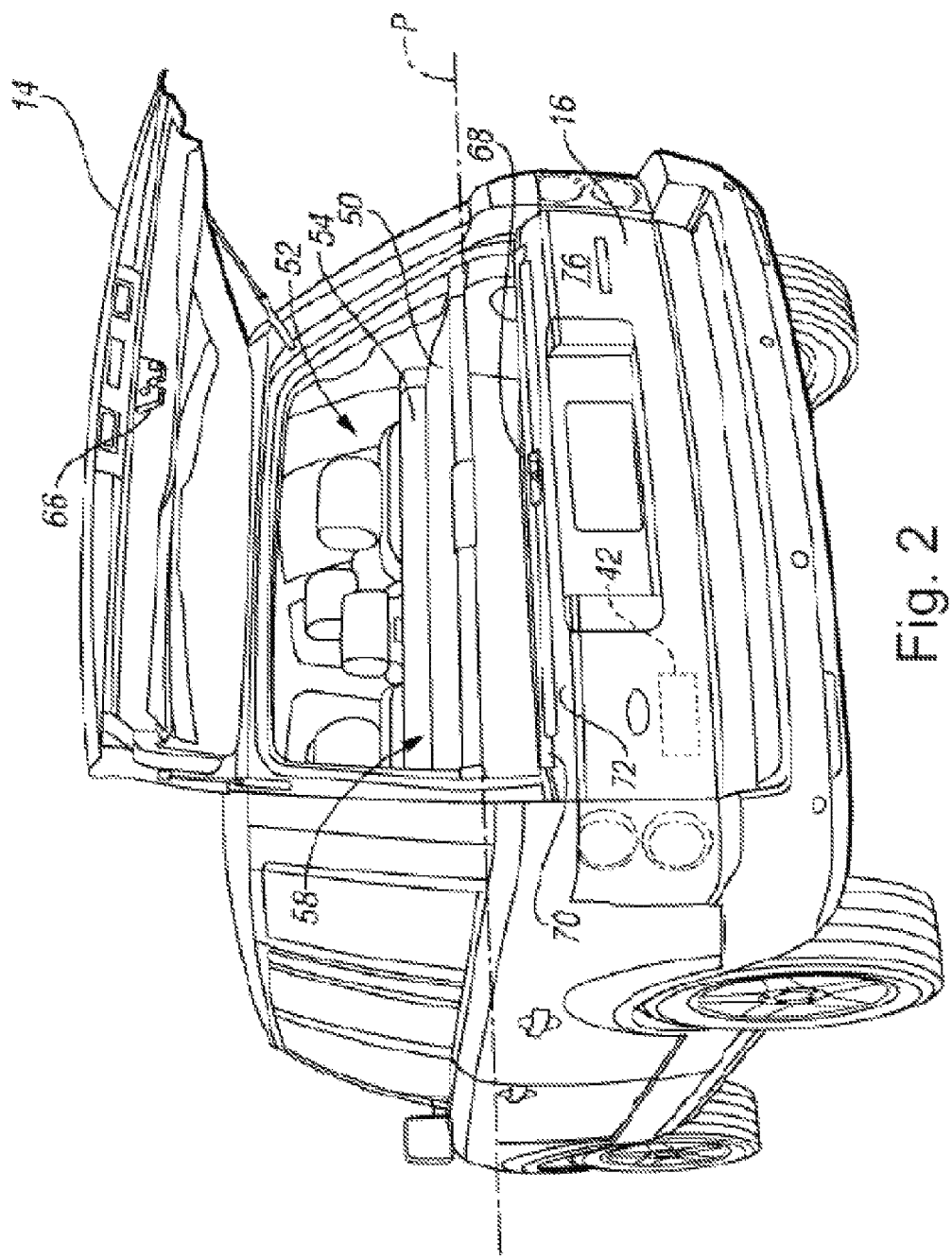
FIG. 2 illustrates articulation of an upper tailgate door to an open position in the system of FIG. 1.

As shown in FIG. 2, a bottom portion 56 of the upper tailgate door 14 includes a latch 66 that mates with a striker 68 included on a lip 70 of the lower tailgate door 16. A ledge 72 is positioned below the striker 68 to cover the bottom 56 of the upper tailgate door 14 so that an exterior portion 74 of the upper door 14 is optionally flush with an exterior portion 76 of the lower door 16 (dependent upon vehicle design) when both doors 14, 16 are closed (see FIG. 1). To open the lower tailgate door 16, the upper tailgate door 14 must be at least partially opened, at least until the lip 70 is able to articulate past the bottom 56 of the upper tailgate door 14 (see FIG. 4), and then the lower tailgate door 16 may be articulated to its open position (see FIG. 3). Depending on the size and shape of the upper and lower tailgate doors 14, 16, in an at least partially opened position sufficient to allow opening of the lower tailgate door 16, an angle of articulation θ of the upper door 14 may be from approximately 10° to approximately 25° or, alternatively, as much as 25% of the total possible angle of articulation $θ_{max}$ of the upper door 14 (between its closed and open positions). Optionally, once the lower tailgate door 16 is clear of the upper tailgate door 14, the upper tailgate door 14 may be automatically articulated back to its closed position or it may remain in a partially open or fully open position.

Figure 3:
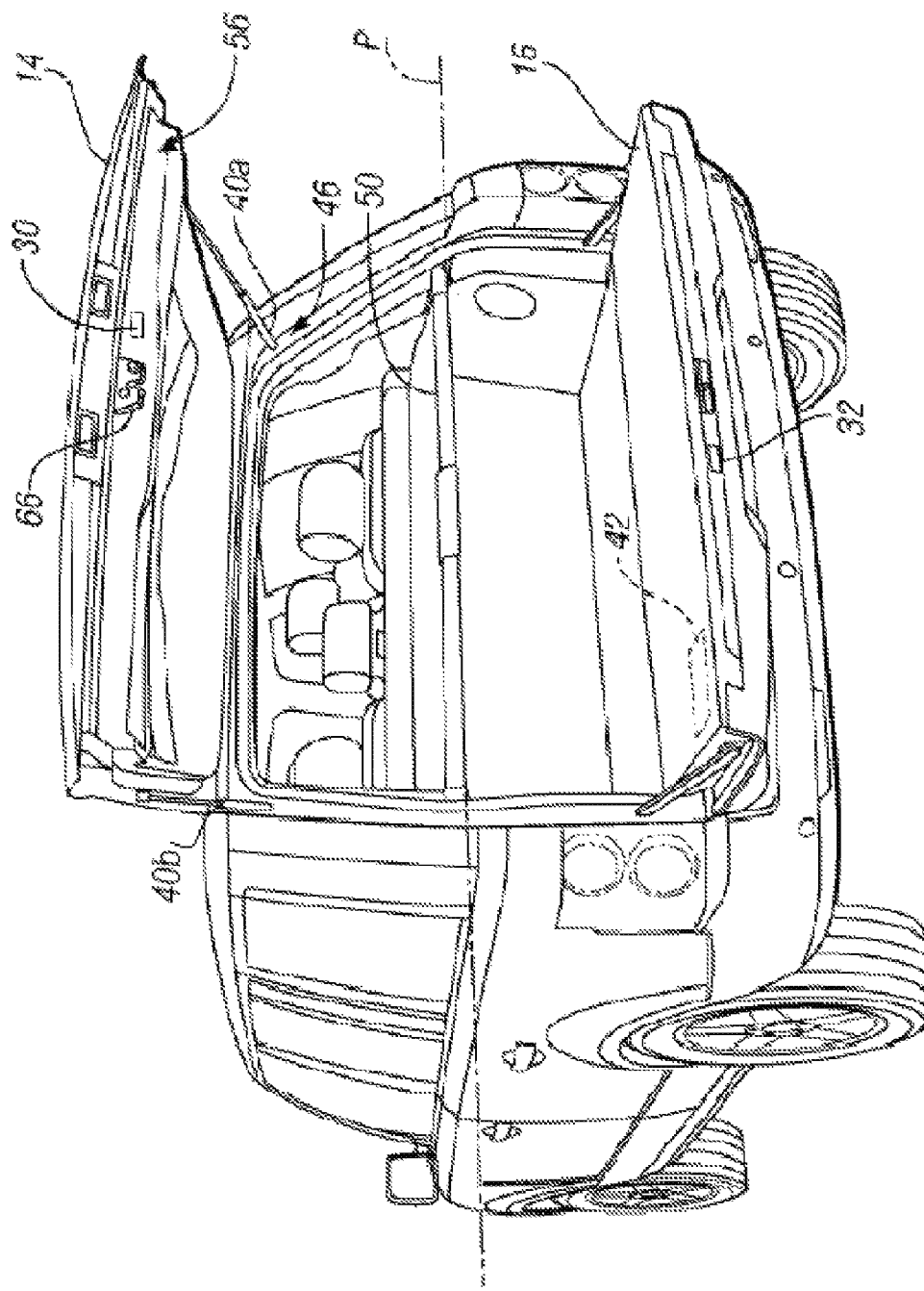
FIG. 3 illustrates articulation of both of an upper and lower tailgate door to an open position in the system of FIG. 1.
Figure 4:
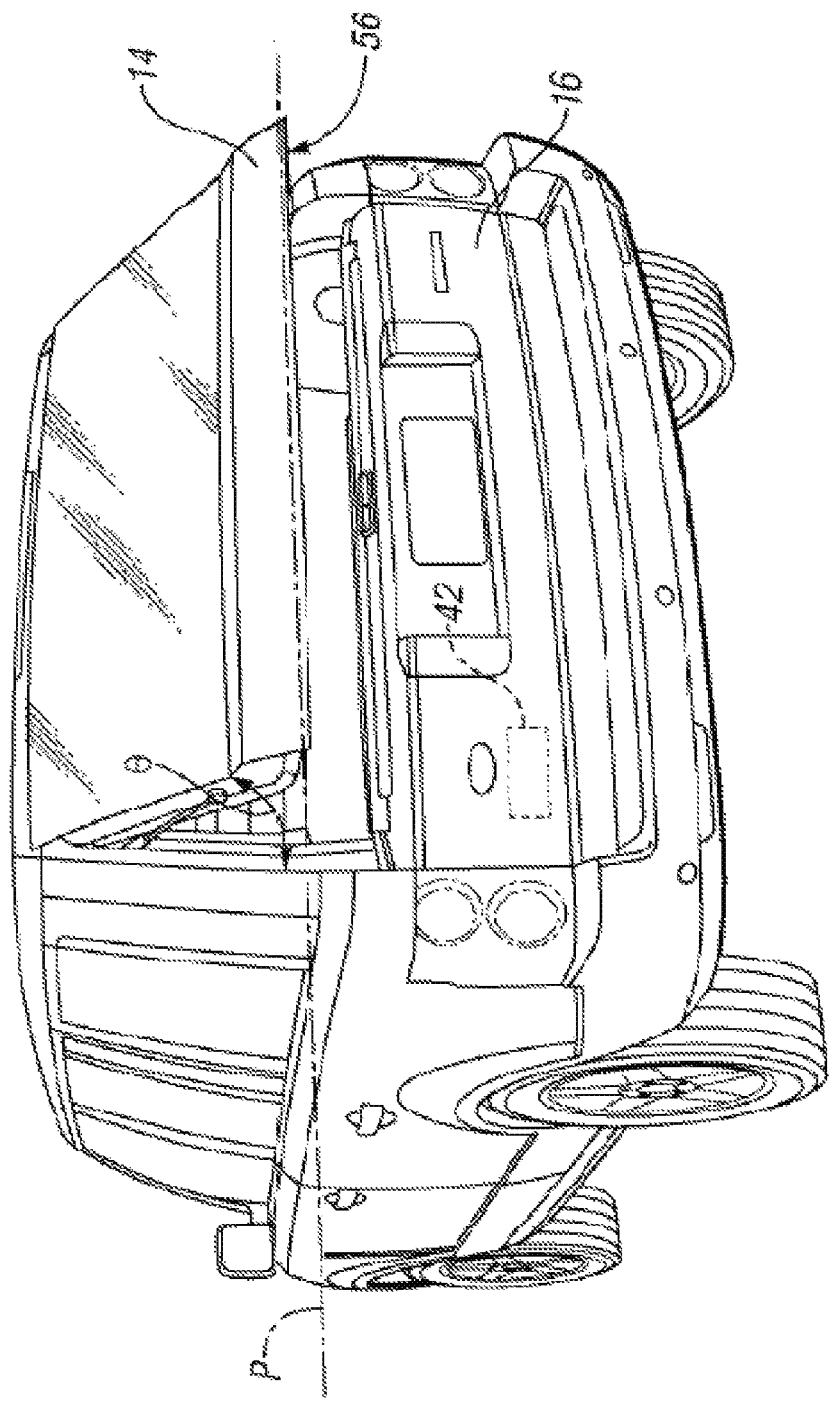
FIG. 4 illustrates articulation of an upper tailgate door in a partially open position in the system of FIG. 1.

Optionally, and as shown in more detail in FIG. 3, a compartment cover 50 may be included with a storage area 52 to extend rearwardly from a rear seat 54 to the tailgate doors 14, 16. The compartment cover 50 may be positioned above a bottom 56 of the upper tailgate door 14 when closed and below a top 58 of the rear seat 54 in order to separate the storage area 52 into upper and lower storage portions.

A control system 18 may be included within the vehicle 10 to control tailgate doors 14, 16 opening and closing. The control system 18 is preferably, but nevertheless optionally, configured to independently control movements of the upper and lower tailgate doors 14, 16. The control system 18 may be configured to include an upper mode control sequence (shown in FIG. 2) where the upper door 14 is actuated to a fully open position while the lower door 16 remains closed. Additionally, the control system 18 may be configured to include a dual-open-mode control sequence (shown in FIG. 3) where both of the upper and lower doors 14, 16 are simultaneously articulated into a fully open position. Depending on the shape of the doors 14, 16, this may include articulating the upper door 14 slightly ahead of (i.e. before)

the lower door 16 to avoid collision. The control system 18 may be configured to include a dual-close-mode (shown in FIG. 4) wherein both the upper and lower doors 14, 16 are simultaneously articulating (albeit with the lower tailgate door 16 moving before the upper tailgate door 14 or faster than the upper tailgate door 14.)

Wireless messages from a remote control 20, such as but not limited to a fob (also referred to as a smart key), may be used to instruct the control system 18 to instigate a tailgate door control, such as, but not limited to, the upper mode; the dual open mode and the dual-close-mode described above. Wireline or wireless signal messages from buttons 24, 28, 30, 32 included within the vehicle cabin, for example positioned on a dashboard 34 and/or included on the exterior of the vehicle, for example mounted to the first and/or second tailgate doors 14, 16 may additionally or alternatively be used to instruct the control system 18 to open and/or close one or both of the tailgate doors 14, 16. The control system 18 may control operations of an upper drive mechanism 40*a*, 40*b* (optionally comprising a powered extensible strut mechanism on either side of the upper tailgate door 14—see FIG. 3) and a lower drive mechanism 42 in order to respectively control upper and lower tailgate door 14, 16 positioning.

With reference to FIG. 1, one of the buttons 24 may be an upper door button (also referred to as an internal upper tailgate release switch), optionally included on the dashboard 34 that instructs the control system 18 to open or to close the upper tailgate door 14. One or more buttons 84 included on the fob 20 may mimic the functionality provided by the button 24 included within the dashboard 34 or may be provided with different functionality dependent upon the timing of the actuation of the button 84 with respect to the immediately succeeding tailgate door control instruction and with respect to the status of the tailgate doors 14, 16. For example, when both doors 14, 16 are open, fob 20 button 84 may be used to initiate the dual-close-mode, whereas when both doors are closed, fob 20 button 84, may be used to initiate the upper mode control. As a further example, when the lower tailgate door 16 is open and the upper door 14 is almost closed, actuation of the fob 20 button 84 may then cause the upper tailgate door 14 to open.

The fob 20 may also include buttons 88, 80, 92 to instruct the control system 18 to execute other vehicle functions, such as but not limited to a door unlock button 80, door lock button 88, and panic button 92, which are commonly employed with remote keyless entry (RKE) related systems. The fob 20 may also perform other operations, such as but not limited to passive entry (PE), including passively supporting tailgate door control sequences. Depression of the fob buttons 84, 88, 80, 92 may instruct the fob 20 to issue a specific message depending on the depressed button.

Another one of the vehicle buttons 28 (also referred to as an external upper tailgate release switch) may be included on an outside portion 76 of the upper tailgate 14 to control opening and closing of the upper tailgate door 14. Another vehicle button 30 (also referred to as a complete close switch) may be included, optionally, on an interior portion of the upper tailgate door 14 to provide easy button access when the upper tailgate door 14 is open. The complete close switch 30 may be used to effect complete closure of the tailgate 12 irrespective of the current state of the tailgate doors 14, 16.

Another button 32 (also referred to as a lower tailgate open/close switch) may be used to control opening and closing of the lower tailgate door 16. This button 32 may be included on a ledge 72 such that it is concealed from view when the upper door 14 is closed, which may be helpful in providing a more uniform rearward appearance for the vehicle 10 than including the button on the exterior portion 74 of the lower tailgate door 16.

First (upper) and second (lower) drive mechanisms 40*a*, 40*b*, 42 are provided which can be independently controlled to independently articulate the upper and lower tailgate doors 14, 16. Because of the independent drive mechanisms, the control system 18 of the present invention is able to sequence tailgate door 14, 16 movements in any suitable manner.

The upper and lower drive mechanisms 40*a*, 40*b*, 42 may each comprise drive units, optionally comprising struts or spindles (not shown). Sensors 90*a*, 90*b*, 90*c*, 90*d*, 90*e*, 90*f* may be disposed on or within the upper and lower drive mechanisms 40*a*, 40*b*, 42. The sensors 90*a*, 90*b*, 90*c*, 90*d*, 90*e*, 90*f* will be described further below.

The upper and lower drive mechanisms 40*a*, 40*b*, 42 are optionally positioned, for exemplary purposes, within a drain channel 46 around an outer perimeter of the upper tailgate door 14 and within an enclosure of the lower tailgate door 16 that may or may not be watertight.

Figure 6:
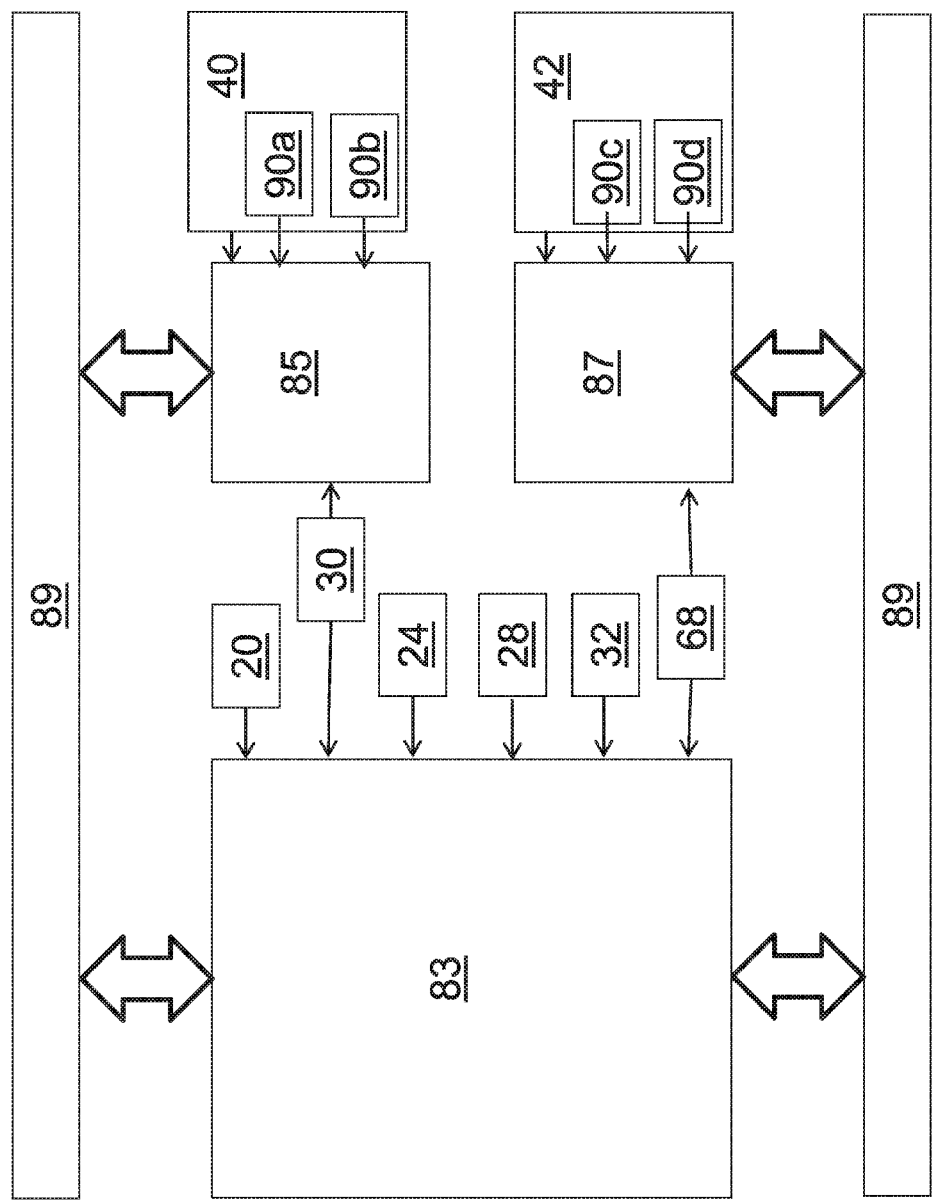
FIG. 6 illustrates schematically a control system comprised in the vehicle of FIG. 1.

Referring to FIG. 6, the control system 18 for controlling independent articulation of the tailgate doors 14, 16 may comprise a Body Control Management Unit (BCM) 83; a first control unit 85 for controlling the first drive mechanism 40*a*, 40*b* that articulates the first (or upper) tailgate door 14; and a second control unit 87 for controlling the second drive mechanism 42 that articulates the second (or lower) tailgate door 16. A Controller Area Network (CAN) provided within the vehicle 10 may be used to convey or exchange information from and/or to each of the BCM 83, first control unit 85 and second control unit 87. In this way the BCM 83, first control unit 85 and second control unit 87 can communicate with one another. In other envisaged embodiments, the control system 18 may not comprise a BCM 83. However, advantageously, the BCM 83 provides a convenient mechanism by which any instruction signals issued by the remote fob 20 and/or remote buttons 24 and/or exterior vehicle mounted buttons 28, 30, 32 can be verified and/or pre-acted upon before being passed onto the first and/or second control units 85, 87. For example, when the tailgate doors 14, 16 are both closed and the fob 20 button 84 is actuated, before the first and second control units 85, 87 are instructed to articulate the upper and lower doors 14, 16 to the open position, the authenticity of the fob 20 may first be verified and then the security latch mechanism 66/68 may be unlocked so that the tailgate doors 14, 16 can actually be opened.

A beneficial aspect of the present invention is that the control system 18 is provided with real-time positional data relating to the position of each of the first and second tailgate doors 14, 16. Positional information may be obtained by using one or more sensors 90*a*, 90*b*, 90*c*, 90*d*, 90*e*, 90*f*. The sensors 90*a*, 90*b*, 90*c*, 90*d*, 90*e*, 90*f* may optionally be disposed on or within each of the first and second drive mechanisms 40*a*, 40*b*, 42. In an embodiment, each drive mechanism 40*a*, 40*b*, 42 (not shown in detail) comprises an extensible strut and a drive unit for powering the strut (which comprises an electric motor). Two Hall sensors 90*a*, 90*b*, 90*c*, 90*d*, 90*e*, 90*f* are disposed within the power strut drive units 40*a*, 40*b*, 42 and provide a signal optionally at about every half rotation of a spindle of the electric motor. The number of rotations of the spindle is proportional to the amount of movement of the tailgate door. The Hall sensors 90*a*, 90*b*, 90*c*, 90*d* disposed within the drive mechanism 40*a*, 40*b* for the first tailgate door 14 optionally transmit data signals directly to the first control unit 85. The Hall sensors 90e, 90f disposed within the drive mechanism 42 for the second tailgate door 16 optionally transmit data signals directly to the second control unit 87.

The first and second control units 85, 87 are configured to count the signals issued by the Hall sensors 90a, 90b, 90c, 90d, 90e, 90f and from that Hall count the first and second control units 85, 87 can each derive or determine an at least approximate absolute or relative position of the tailgate door 14, 16 they are controlling.

When the upper and/or lower tailgate door 14, 16 is latched in a closed position definitive data regarding the position of that latched door is known. This positional data can be communicated by the latch mechanism 68, optionally directly to the BCM 83. In the control system 18 of an embodiment, the BCM 83 is coupled to a CAN 89 and thereby can exchange or transfer data with or to the first and second control units 85, 87 (see FIG. 6). The latch mechanism 66/68 may optionally communicate directly with the second control unit 87. (In other embodiments, the latch mechanism 66/68 may communicate only with the BCM 83, only with the first control unit 85 or only with the second control unit 87 or may communicate with any combination of them. Referring to FIG. 6, any or all of the fob 20 and buttons 24, 28, 32, 30 may communicate with (by issuing signals to) the BCM 83 and/or one or both of the first and second control units 85, 87.

Figure 5B:
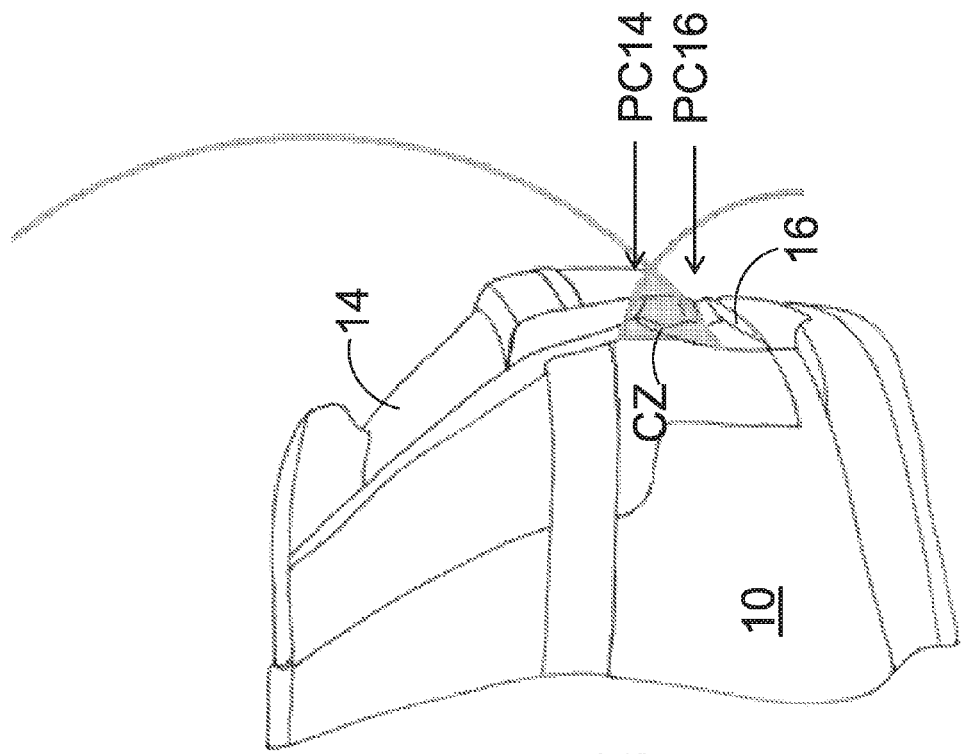
Figure 5A:
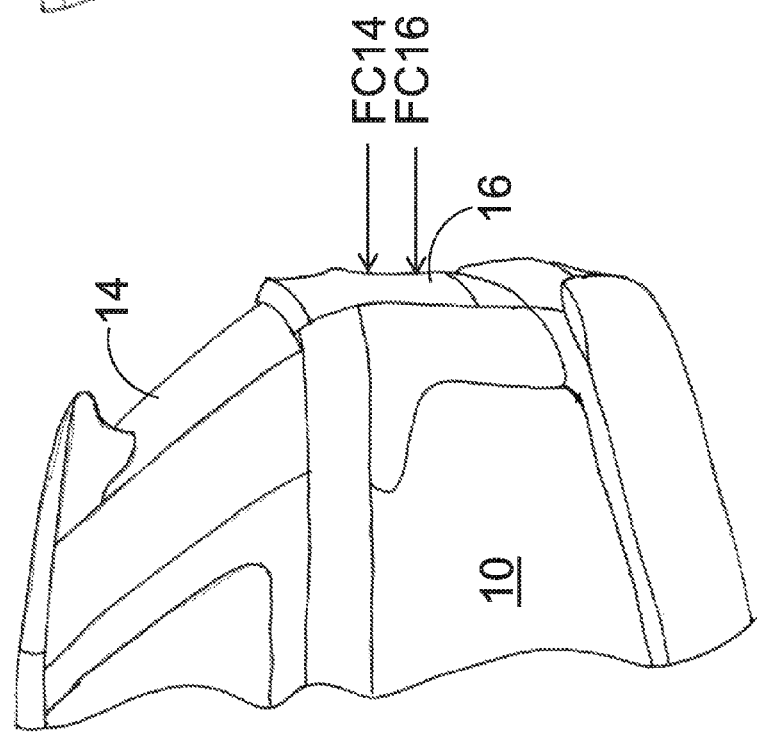

In FIGS. 1 and 5a both the upper and lower tailgate doors 14, 16 are shown as latched. The fully closed position of the upper tailgate door 14 (optionally as indicated by the striker 68) may be referred to as FC14; and the fully closed position of the lower tailgate door 16 may be referred to as FC16.

From the latched position (FIG. 5a), if a tailgate door 14, 16 is articulated by its control unit 85, 87, the Hall sensors from the appropriate drive mechanism 40a, 40b, 42 will issue a data signal to the control unit 85, 87 connected thereto. As the Hall count progressively increases, each control unit 85, 87 tracks the position of the moving tailgate door 14, 16 it is controlling. In FIG. 5b, it is illustrated that a command or instruction has been issued to the control system 18 to open the upper tailgate door 14 (optionally via the fob 20; internal upper tailgate release switch 24; or external upper tailgate release switch 28). Optionally, subsequently an instruction has been issued to the control system 18 to open the lower tailgate door 16 (optionally via external lower tailgate open/close switch 32). (Alternatively a dual-open-mode may be initiated by a button or the fob 20 in another envisaged embodiment).

The optional provision of only a restricted access button 32 for activating opening articulation of the lower tailgate door 16 optionally ensures that during an opening sequence, the articulation of the upper tailgate door 14 must be commenced before the automatic articulation of the lower tailgate door 16 can be commenced. Additionally, optional provision of only a restricted access button 32 for activating opening articulation of the lower tailgate door 16 may mitigate against potential loss of cargo disposed in the storage area 52 that could otherwise result if both the upper and lower tailgate doors 14, 16 could be power-opened automatically by a remotely positioned actuator (the fob 20 or internal button). In the optional embodiment illustrated, to access the restricted access button 32 for activating opening articulation of the lower tailgate door 16 a user of the vehicle 10 must be positioned in reasonably close proximity to the lower tailgate door 16 and storage area 52. Therefore actuation of the button 32 for activating opening articulation of the lower tailgate door 16 is likely to be a deliberate, managed and suitable command. In other embodiments of the invention, automatic opening articulation of the lower tailgate door 16 may be effected by the fob 20 button 84; an interior vehicle button; and/or an exterior vehicle mounted button (access to which may or may not be restricted by the upper tailgate 14 in its closed position). In other embodiments, the control system 18 of the present invention is nevertheless configured to control the upper and lower tailgate doors 14, 16 by means of the first and second drive mechanisms 40a, 40b, 42 and their control units 85, 87 to ensure that no collision of the upper and lower tailgate doors 14, 16 occurs.

Referring again to FIG. 5b, the upper tailgate door 14 has been articulated before the lower tailgate door 16. A further beneficial aspect of the present invention is that a collision zone 'CZ' is defined. This is the region in which there is a risk of collision of the upper and lower tailgate doors 14, 16 (if they are not suitably controlled). Preferably, the definition of the collision zone 'CZ', whilst based to some extent at least upon the geometry of the tailgate doors 14, 16, includes a safety margin or tolerance either side of the geometric locations at which the upper and lower tailgate doors 14, 16 have the potential to collide. Optionally, the collision zone 'CZ' may be defined in terms of a Hall count range for each of the lower and upper doors 14, 16. When the upper tailgate door 14 is disposed within the collision zone 'CZ', the position of the upper tailgate door 14 may be referred to as PC14. When the lower tailgate door 16 is disposed within the collision zone 'CZ', the position of the lower tailgate door 16 may be referred to as PC16.

During the commanded opening operation, the tailgate doors 14, 16 are further articulated from the collision zone 'CZ' to wide open positions and their positions continue to be tracked by the first and second control units 85, 87 respectively (using the Hall sensors 90a, 90b, 90c, 90d, 90e, 90f and incrementally counting the movement of spindle of the drive mechanisms 40a, 40b, 42). After moving out of the collision zone 'CZ', but not yet having reached a fully open position, the position of the upper tailgate door 14 may be referred to as the wide open position or WO14. Similarly, after moving out of the collision zone 'CZ', but not yet having reached a fully open position, the position of the lower tailgate door 16 may be referred to as the wide open position or WO16 (see FIG. 5c).

As the tailgate doors 14, 16 are further articulated from the wide open positions WO14, WO16 to fully open positions, their positions continue to be tracked by the first and second control units 85, 87 respectively, using the Hall sensors 90a, 90b, 90c, 90d, 90e, 90f and incrementally counting the internal movement of the drive mechanisms 40a, 40b, 42. When the fully open position of the upper tailgate door 14 is reached (which may be referred to as the fully open position or FO14—see FIG. 5d), the commanded operation of the upper tailgate door 14 is completed. To effect further automatic operation a user of the vehicle 10 needs to issue a further command to the control system 18, using the fob 20, or other suitable control button, (i.e. the internal upper tailgate release switch 24, or the complete close switch 30). Similarly, when the fully open position of the lower tailgate door 16 is reached (which may be referred to as the fully open position or FO16—see FIG. 5d) the commanded operation of the lower tailgate door 16 is completed. To effect further power or automatic operation, a user of the vehicle 10 needs to issue a further command to the control system 18, using the fob 20 or other suitable control button, (i.e. the lower tailgate open/close switch 32, or the complete close switch 30).

In some embodiments, the fully open position FO14 of the upper tailgate 14 may not equate to the full extent of travel permitted by a hinge mechanism (not shown), but may be limited, optionally, to about 98%. (The full extent of travel permitted by the upper tailgate door 14 may be a user defined parameter). Restriction of the full extent of travel may be beneficial in order to minimise wear on the hinge; to mitigate against the noise that may be made when the upper tailgate door reaches and/or contacts a physical hinge limit; and/or to ensure that the operation of the upper tailgate 14 is smooth. Optionally, the lower tailgate door 14 is permitted to reach the full extent of travel permitted by its hinge mechanism (not shown) or may be limited by cable stays.

A command to close the upper and or lower tailgate doors 14, 16 (which, for example, may be issued by a user actuating the button 84 on the fob 20 or actuating the complete close switch 30) results in the control system 18 instructing the first and second drive mechanisms 40a, 40b, 42 (optionally via the first and second control units 85, 87) to sequentially return the tailgate doors 14, 16 to their closed positions. From the FIG. 5d position, both tailgate doors 14, 16 may be moved simultaneously. However, the lower tailgate 16 may be articulated at a faster angular velocity such that it reaches its closed position before the upper tailgate door 14 has even entered the collision zone 'CZ'. Alternatively, from the FIG. 5d position, the lower tailgate door 16 may be moved before the upper tailgate door 14 is moved to mitigate against collision and to ensure that both tailgate doors 14, 16 can be properly closed.

In the present embodiment, before the control system 18 instructs the first and/or second drive mechanism 40, 42 to carry out any command that is has been signalled to perform by a user actuating any one of the optional buttons 20, 22, 24, 28, 30, 32, the control system 18 is configured to determine whether the command can or should be carried out. Then, once the command is accepted and is being carried out, the first control unit 85 continually gathers positional data relating to the upper tailgate door 14 and the second control unit 87 continually gathers positional data relating the lower tailgate door 16. The gathered positional data is then shared, optionally via each of the first and second control units 85, 87 exchanging data on the CAN 89 such that each of the control units 85, 87 has knowledge about the real-time position of each tailgate door 14, 16.

Optionally, the positional data gathered may be absolute positional data or relative positional data. Optionally, the positional data may be categorised as it is gathered by the control system 18 and only the categorised positional data may be shared between control units 85, 87. Optionally, the positional data may be categorised as described above such that each tailgate door 14, 16 will, at any moment in time, be in one of the following four positions: CLOSED (FC14, FC16); COLLISION ZONE (PC14, PC16); WIDE OPEN (WO14, WO16); FULLY OPEN (FO14, FO16). The control system 18 may also, optionally, at least temporarily, store data relating to any one or more of: the last command issued to it; the direction of travel (toward open or toward close) of each tailgate door 14, 16.

Because a user of the vehicle 10 can manually position both of the upper and lower tailgate doors 14, 16 and/or because powered operation can be interrupted by an obstacle and/or because powered operation can be interrupted by a user issuing another command during an operating sequence, the control system of the present invention is advantageously configured to mitigate against or prevent collision of the tailgate doors 14, 16 (within the collision zone 'CZ'). The following described how the control system 18 may be configured in some embodiments.

When any acceptable open command is issued (open upper tailgate door 14 only; open lower tailgate door 16 only or open both tailgate doors 14, 16), the stationary starting position PC14, PC16 of both the upper and lower tailgate doors 14, 16 may be within the collision zone 'CZ'. In this circumstance, the control system 18 is configured not to take any action and not to permit any automatic power movement of either tailgate door 14, 16. The tailgate system 12 will remain in the same position until a user manually moves at least one of the tailgate doors 14, 16 out of the collision zone 'CZ'.

Similarly, when any acceptable close command is issued (close upper tailgate door 14 only; close lower tailgate door 16 only or close both tailgate doors 14, 16), the stationary starting position PC14, PC16 of both the upper and lower tailgate doors 14, 16 may be within the collision zone 'CZ'. (This situation could arise because a user of the vehicle 10 has manually positioned both of the upper and lower tailgate doors 14, 16 within the collision zone 'CZ'). In this circumstance, the control system 18 is configured not to take any action and will not to permit any automatic power movement of either tailgate door 14, 16. The tailgate system 12 will remain in the same position until a user manually moves at least one of the tailgate doors 14, 16 out of the collision zone 'CZ'.

The control system 18 is configured such that if during a command sequence, the upper tailgate door 14 adopts a stationary position PC14 within the collision zone 'CZ', then the other lower tailgate door 16 either will be stopped from automatically moving any further or its direction of travel will be reversed. Similarly, the control system 18 is configured such that if during a command sequence, the lower tailgate door 16 adopts a stationary position PC16 within the collision zone 'CZ', then either the other upper tailgate door 14 will be stopped from automatically moving any further or its direction of travel will be reversed.

The control system 18 is further configured such that if during a command sequence, the upper tailgate door 14 adopts a stationary position PZ14 within the collision zone 'CZ' and the lower tailgate door 16 adopts a stationary position PZ16 within the collision zone 'CZ' then, rather than prevent further powered movement of either tailgate door 14, 16 until a user manually addresses the situation, more preferably, both tailgate doors 14, 16 are reversed. In the present embodiment the doors are reversed until they are fully open or fully closed, depending on their direction of movement before they adopted a stationary position, i.e. before they were stopped. In an alternative embodiment, the doors are reversed to positions which are no longer in the collision zone. These positions may not necessarily be fully open or fully closed positions. The control system 18 is optionally additionally configured such that if an obstacle is detected by either the upper or lower tailgate door 14, 16 then that tailgate door is power stopped. The control system 18 optionally may then reverse the direction of the stopped tailgate door.

In the specific situation where an obstacle is extending, for example, out of the opening 'O' and the obstacle is detected by the upper tailgate door 14 and/or the lower tailgate door 16 as those doors are closing 14, 16 the control system 18 is configured to powerstop both tailgate doors 14, 16 and then, rather than preventing further powered movement of either tailgate door 14, 16 until a user manually addresses the situation (optionally because both doors 14, 16 are within the collision zone 'CZ'), in an optional beneficial aspect of the invention, preferably, both tailgate doors 14, 16 are powered to move in the reverse direction and are opened to the fully open position F014, F016. In an alternative embodiment, the or each door may again be powered to move in a reverse direction, but to a position which is not fully open, i.e. to a position intermediate between the position at which the door is stopped and the fully open position. The or each door may be moved in a reverse direction until in a substantially fully open position, that is a position which is close to fully open, and would appear to the user as fully open. The obstacle may not be detected by the tailgate door, but by a sensor or sensors positioned elsewhere.

It will be recognised upon reading the present description that many and various configurations for the control system 18 are suitable. In other embodiments it is envisaged that the control system 18 will comprise only one control unit that is connected to both the first and second drive mechanisms 40a, 40b, 42 for the upper and lower tailgate doors 14, 16 and which is nevertheless configured to carry out the control sequences described herein and/or otherwise independently control the articulation of the upper and lower tailgate doors 14, 16. Within the control system 18 one or more devices, sensors and/or control units may communicate with one another to ensure that each aspect of the control system 18 that controls a drive mechanism 40a, 40b, 42 for one of the tailgate doors 14, 16 is provided with positional information relating to both of the tailgate doors 14, 16. Many and various suitable forms of communication are envisaged for the various components of the control system 18 and the sensors, devices and/or other control units that the control system 18 communicates with. Data signals may be transmitted via wired or wireless links and may be transmitted directly or indirectly (for example via a CAN) as is suitable.

It will be recognised that data signals may be issued continuously or discretely and where data signals are issued discretely they will be issued with a frequency that is sufficient (relative to the speed of movement of the tailgate doors 14, 16) that the data signals can be treated as being issued in "real-time".

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention. The features of various implementing embodiments may be combined to form further embodiments of the invention.

It is envisaged that in other embodiments, a different mechanism may be used for tracking the position of each tail gate door. For example, a camera could be positioned on the inside of the tailgate door 14, 16 and in dependence upon what it sees within the vehicle 10 the position of the tailgate door may be determined. Furthermore, an ultrasound sensor or infra-red sensor may be used on the tailgate and by monitoring the echo response of a transmitted pulse the angle of the sensor and then hence the position of the tailgate door may be determined. Any suitable combination of sensors in addition or alternative to the Hall sensors described may be used.

While embodiments of the invention have been illustrated and described, it is not intended that these embodiments illustrate and describe all possible forms of the invention. Rather, the words used in the specification are words of description rather than limitation, and it is understood that various changes may be made without departing from the scope of the invention.

The methods, algorithms and control processes described herein can be machine implemented. The methods, algorithms and control processes described herein can be implemented on one or more computational device(s) comprising one or more processors, for example, an electronic microprocessor. Such processor(s) may be configured to perform computational instructions stored in memory or in a storage device accessible by the processor(s).

The invention claimed is:

1. A power, split door system for a vehicle, comprising:
a first vehicle door arranged to articulate between a closed position and an open position;
a second vehicle door arranged to articulate between a closed position and an open position;
first and second drive mechanisms for articulating the first and second vehicle doors, respectively, between the closed and open positions; and
a controller for controlling the first and second drive mechanisms so as to control movement of the first and second doors between the open and closed positions;
wherein a collision zone is defined as a region of the door system in which the first vehicle door and the second vehicle door could potentially come into contact with one another;
wherein the controller is configured to determine if both of the first and second vehicle doors is within a collision zone during powered articulation of the vehicle doors; and
where, in the event that the first and second vehicle doors are both stopped within the collision zone during a powered articulation, the controller is configured to:
a) control the first and/or second drive mechanisms to articulate one or both of the first and second vehicle doors out of the collision zone in a manner that avoids collision of the first and second vehicle doors;
b) control the first and/or second drive mechanisms to articulate one or both of the first and second vehicle doors in a reverse direction to the direction they were being articulated in and into either their fully open or fully closed positions in an appropriate manner that avoids collision of the first and second vehicle doors; or
c) maintain the first and second vehicle doors in a stopped condition.

2. A system as claimed in claim 1 wherein, the first vehicle door partially overlaps the second vehicle door, when the first and second vehicle doors are in their closed positions and wherein the collision zone is defined based upon the geometry of the first and second doors and includes an additional margin.

3. A system according to claim 2 wherein the first vehicle door is an upper tailgate door and is disposed above the second vehicle door which is a lower tailgate door and wherein said additional margin of the collision zone extends from the lowest position in which the upper and lower doors could contact one another to immediately above the closed position of the lower tailgate door.

4. A system according to claim 1, wherein the controller comprises a first control unit for controlling the first drive mechanism and a second control unit for controlling the second drive mechanism.

5. A system according to claim 1, wherein the system comprises means for detecting the presence of an obstacle extending out of a vehicle opening created when the first and second vehicle doors are at least partially open and/or for detecting an obstacle external to the vehicle in the opening path of either the first and/or second vehicle doors.

6. A system according to claim 5, wherein the means for detecting comprises one or more of: a Hall sensor, a camera, an ultrasound sensor and an infrared sensor.

7. A system according to claim 1, wherein, in the event that powered articulation of the first and second vehicle doors is interrupted when the controller is controlling the first and second drive mechanisms to articulate the first and second vehicle doors into their respective closed positions, the controller is configured to reverse the direction of articulation of the first and second vehicle doors and to articulate the first and second vehicle doors to their respective fully open positions.

8. A system according to claim 1, wherein, in the event that powered articulation of the first and second vehicle doors is interrupted when the controller is controlling the first and second drive mechanisms to articulate the first and second vehicle doors into their respective open positions, the controller is configured to stop articulation of the first and second vehicle doors and maintain the first and second vehicle doors in a stopped condition.

9. A power, split door system for a vehicle, comprising:
a first vehicle door arranged to articulate between a closed position and an open position;
a second vehicle door arranged to articulate between a closed position and an open position;
first and second drive mechanisms for articulating the first and second vehicle doors, respectively, between the closed and open positions; and
a controller for controlling the first and second drive mechanisms so as to control movement of the first and second doors between the open and closed positions;
wherein the system is operable in a dual open mode in which the controller is configured to control the first and second drive mechanisms to articulate the first and second vehicle doors from their respective fully closed positions to respective open positions, and wherein operation of the system in the dual open mode comprises articulating the first and second vehicle doors simultaneously, wherein the second vehicle door is articulated at a greater velocity than the first vehicle door.

10. A system according to claim 9, wherein the controller is configured to commence articulation of the first vehicle door before the second vehicle door.

11. A system according to claim 9, wherein the respective open positions of the first and second vehicle doors correspond to respective fully open positions of the first and second vehicle doors.

12. A system according to claim 11, wherein the door system is a power split tailgate system of a vehicle, wherein the first vehicle door is an upper tailgate door and the second vehicle door is a lower tailgate door, wherein the fully open position of the upper tailgate is less than the full extent of travel of a hinge mechanism of the upper tailgate and/or wherein the fully open position of the lower tailgate is equal to the full extent of travel of a hinge mechanism of the lower tailgate.

13. A system according to claim 9, wherein the door system is a power split tailgate system of a vehicle, wherein the first vehicle door is an upper tailgate door and the second vehicle door is a lower tailgate door.

14. A system according to claim 13, wherein the lower tailgate door is articulated at a greater angular velocity that the upper tailgate door.

15. A power, split door system for a vehicle, comprising:
a first vehicle door arranged to articulate between a closed position and an open position;
a second vehicle door arranged to articulate between a closed position and an open position;
first and second drive mechanisms for articulating the first and second vehicle doors, respectively, between the closed and open positions; and
a controller for controlling the first and second drive mechanisms so as to control movement of the first and second doors between the open and closed positions;
wherein the system is operable in a dual close mode in which the controller is configured to control the first and second drive mechanisms to articulate the first and second vehicle doors from respective open positions to their respective closed positions, and wherein operation of the system in the dual close mode comprises articulating the first and second vehicle doors simultaneously, wherein the second vehicle door is articulated at a greater velocity than the first vehicle door.

16. A system according to claim 15, wherein the controller is configured to commence articulation of the second vehicle door before the first vehicle door.

17. A system according to claim 15, wherein the respective open positions of the first and second vehicle doors correspond to respective fully open positions of the first and second vehicle doors.

18. A system according to claim 15, wherein the door system is a power split tailgate system of a vehicle, wherein the first vehicle door is an upper tailgate door and the second vehicle door is a lower tailgate door.

19. A system according to claim 18, wherein the lower tailgate door is articulated at a greater angular velocity that the upper tailgate door.

20. A vehicle comprising a power split door system according to claim 1.

* * * * *